US006278461B1

(12) United States Patent
Ellenby et al.

(10) Patent No.: US 6,278,461 B1
(45) Date of Patent: Aug. 21, 2001

(54) AUGMENTED REALITY VISION SYSTEMS WHICH DERIVE IMAGE INFORMATION FROM OTHER VISION SYSTEMS

(75) Inventors: John Ellenby; Thomas W. Ellenby; Peter M. Ellenby, all of San Francisco, CA (US)

(73) Assignee: GeoVector Corporation, San Francisco ( * ) Notice: Subject to any disclaimer, the term of this patent is extended or adjusted under 35 U.S.C. 154(b) by 0 days.

(21) Appl. No.: 08/870,024

(22) Filed: Jun. 5, 1997

Related U.S. Application Data

(63) Continuation-in-part of application No. 08/411,299, filed on Mar. 27, 1995, now Pat. No. 5,710,395, which is a continuation-in-part of application No. 08/119,360, filed on Sep. 10, 1993, now Pat. No. 5,815,411.

(51) Int. Cl.[7] .............................. G06T 15/20; H04N 9/47
(52) U.S. Cl. ........................................... 345/427; 348/143
(58) Field of Search .................................... 348/143–159, 348/206–241; 345/7–9, 418–427, 433–439; 434/32; 358/448–450

(56) References Cited

U.S. PATENT DOCUMENTS

| 4,645,459 | * | 2/1987 | Graf et al. ............................. 434/43 |
| 4,992,866 | * | 2/1991 | Morgan ................................ 348/159 |
| 5,455,689 | * | 10/1995 | Taylor et al. ........................ 358/450 |

* cited by examiner

Primary Examiner—Tan Nguyen
Assistant Examiner—Thu Nguyen
(74) Attorney, Agent, or Firm—Page Lohr

(57) ABSTRACT

A vision system which collects information from similar vision systems having a different perspective of a scene are arranged to produce a composite image. The composite image having information from both perspectives can then include features impossible to otherwise show. Objects otherwise "hidden" from a first perspective are displayed as information from a second perspective may contain imagery relating to those images. A translation of spatial coordinates conditions the image from the second perspective such that it will fit into a composite image and match the first perspective.

9 Claims, 12 Drawing Sheets

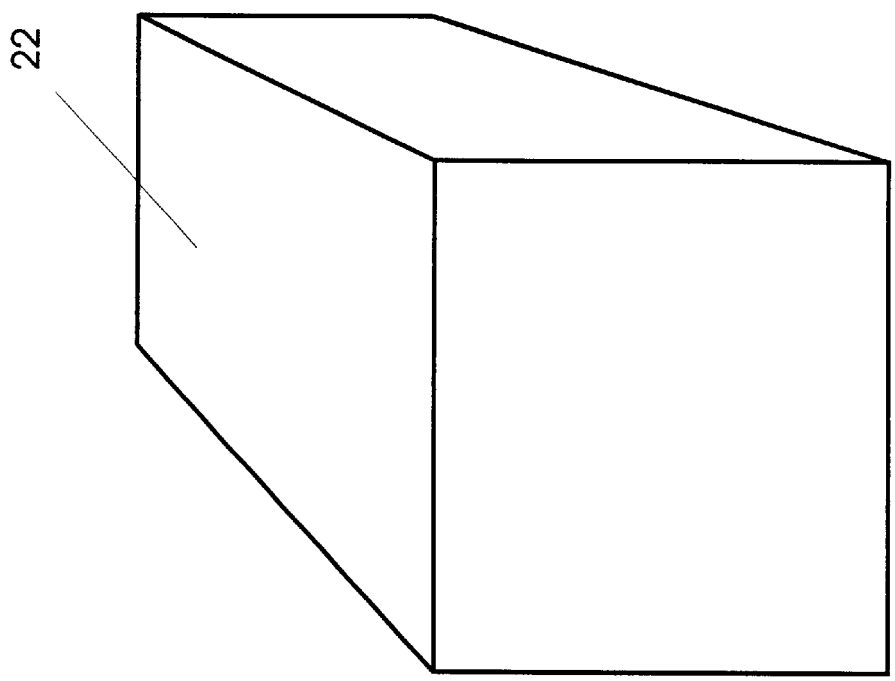
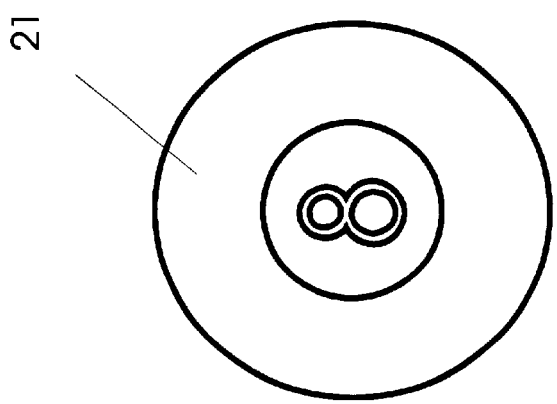
Figure 2

AUGMENTED REALITY VISION SYSTEMS WHICH DERIVE IMAGE INFORMATION FROM OTHER VISION SYSTEMS

This application is a continuation-in-part application of a previously filed application having a Ser. No. 08/411,299, filed Mar. 27, 1995 now U.S. Pat. No. 5,710,395 which is in turn a continuation-in-part application of the application having Ser. No. 08/119,360, filed Sep. 10, 1993, now U.S. Pat. No. 5,815,411 both presently pending. The entire text of those disclosures is hereby incorporated into this application by reference.

BACKGROUND OF THE INVENTION

This invention is generally concerned with communication between one or more vision systems and specifically concerned with presentation of augmented images in a first vision system based partially on information derived from a second vision system.

Certain vision system devices have been provided to aid in the interpretation of a scene being addressed by a user of the vision system. Information relating to the scenes being addressed is somehow "known" to the system. This information is generally used to augment the user's view of the real scene.

For example, in U.S. Pat. No. 2,994,971, by Meisenheimer et al, a starmap is painted onto a clear substrate. When the substrate is placed at arm's length into the line-of-sight of a user observing astronomical scenes, the painted starmap can be viewed simultaneously with the scene. Certain features of the real scene may be invisible; for example the imaginary lines which connect stars to form a constellation. As a prepared starmap may effectively represent those lines, it is useful to view the real scene in combination with the starmap.

Since the information painted onto the substrate is particular to a certain scene, we say the device has "prior knowledge" of which scene is to be addressed by the device. For the example at hand, a transparent substrate is prepared with starmap information which relates to a certain constellation. Therefore, the device is ineffective for viewing scenes other than the particular scene for which it has been designed.

It is also important to point out that this system superimposes the two images onto a single optical path. A viewer's line of sight defines the optical path and the substrate serves as an optical combiner to combine the image of the real scene at one plane (optical infinity) with the image of the starmap at a second plane.

A second example, U.S. Pat. No. 5,311,203 by Norton, is much more versatile. The device determines which scene is being addressed by the vision system and recalls from a computer previously recorded image information relating thereto. In this way, data relating to various scenes can be played onto the device in accordance with the different scenes which may be addressed by the device.

As in the prior example, the device relies on prerecorded information or prior knowledge of the scenes to be viewed. The system's designer must first prepare images which relate to those scene expected to be addressed by the system. If the system addresses an unknown scene, the computer has no facility for generating images to be superimposed with the real scenes.

Similarly with respect to the previous example, the device of Norton combines two optical paths with contain image information from two sources. Norton optically combines information from the real scene and information from a computer generated image.

Both of the devices described above superimpose the recorded information with information of the real scene via optical combiner schemes. Common head-up displays HUD and helmet mounted type displays HMD also rely on optical combiners to join image information generated by a computer to augment a scene being viewed. In HUDs and HMDs, information generated by a computer, for example the extent of a runway, is based on what is known to be within a particular scene being addressed by the system. The system's computer must possess knowledge of physical details of a runway to use the vision system to view that runway. An example of this system is nicely illustrated in a paper by Burgess, et al, "Synthetic Vision—A View in the Fog" IEEE Aerospace and Electronic Systems Magazine, vol. 8, Issue 3, March 93, pp. 6–13.

A vision system developed previously by the present inventors which is the subject of the patent application identified above and which is the parent application to this application, identifies a scene based on position and attitude measurements to determine which scene is being addressed. The system then recalls information from a computer and forms a composite image to be displayed to a user. In contrast to other vision systems, the composite image is formed in the electrical domain compared to the optical domain. Operating on image information in a digital electronic domain provides certain advantages over manipulation of optical beams when considering the functions of these vision systems.

Each of the vision systems taught previously rely on having prior knowledge or stored information of scenes being addressed and uses that information to present an augmented image of the scene. Apparatus of the present invention may use stored information but it also uses information collected in real-time from remotely located cooperating vision systems. While the systems and inventions of the prior art are designed to achieve particular goals and objectives, some of those being no less than remarkable, these inventions have limitations which prevent their use in new ways now possible. These prior art inventions are not used and cannot be used to realize the advantages and objectives of the present invention.

SUMMARY OF THE INVENTION

Comes now, John, Thomas and Peter Ellenby with an invention of an apparatus including devices for and methods of augmenting images of real scenes wherein information used to augment the real scene is derived from a plurality of vision systems in communication with each other. It is a primary function of these apparatus and methods to provide augmented images of real scenes based on information received in real time from a plurality of vision systems. It is a contrast to prior art methods and devices that those systems do not share information with other similar vision systems. A fundamental difference between vision systems of the instant invention and those of the art can be found when considering its communication with other vision systems having different perspectives of a commonly addressed scene.

As a plurality of viewers simultaneously address a single scene from different perspectives (i.e. from different points-of-view), there may be information which is readily available to a first perspective but not readily available to a second perspective. If a plurality of vision systems used to view the scene are in communication with one another, they may be arranged to share image information such that features of the scene which were previously unavailable from any particular point of view then become available via that communication with the other vision system which may supply image information otherwise not available. An image of a scene as viewed from a particular perspective can be operated on by a translation of perspective to result in image information which is useful to a vision system having a different perspective. A first vision system, addressing the same scene from a different perspective can then provide presentation of a composite image of the scene in the natural perspective of that vision system. Images displayed at the first perspective are comprised of image information from two sources: 1) image information gathered normally (i.e. photonically and recall from a database) from the first vision system and 2) image information gathered at the second vision system, operated on by a translation of perspective, and transmitted from the second vision system to the first. The composite image could then have content which would be otherwise impossible to obtain in simple vision systems addressing the scene from that first perspective.

It is a primary object of the invention to provide an apparatus having a plurality of vision systems each being dynamic in both position and attitude and in communication with each other. Further each systems position and attitude is independent of the other. It is an object of the invention to provide communication between a plurality of vision systems. It is a further object to augment an image of a first vision system based on information received from a second vision system. It still further an object to provide a first vision system having certain perspective with image information from a second vision system having another perspective which enables the first vision system to present a composite image where the composite image includes information content based on information from the first and second vision systems.

In accordance with those features and objectives, apparatus for displaying composite images of a scene comprising a plurality of vision systems operable for addressing a common scene, each vision system being dynamic in position and attitude and independent of the position and attitude of each other system, the apparatus comprising at least two vision systems in communication with each other, are provided.

In addition, methods which also meet the above mentioned features and objectives; i.e. methods of forming composite images with a plurality of vision systems each having a different perspective of a common scene, the method comprising the steps: determine the position and attitude of each vision system; form an image of the scene being addressed with each vision system; translate the perspective of the transmitted image to form an image having a perspective of the second image system; combine the image having a translated perspective with an image formed by the second vision system to form a composite image; and present the composite image in the natural perspective of the second vision system, are provided.

A better understanding can be had with reference to the detailed description of Preferred Embodiments of the Invention and with reference to the appended drawings. These embodiments represent particular ways to realize the invention and are not inclusive of all ways possible. Therefore, there may exist embodiments that do not deviate from the spirit and scope of this disclosure as set forth by the claims, but do not appear here as specific examples. It will be appreciated that a great plurality of alternate versions are possible.

BRIEF DESCRIPTION OF THE DRAWINGS

The objects mentioned and other features, aspects, and advantages of the present invention will become better understood with regard to the following description and drawings, where:

FIG. 2 is an image of the scene of FIG. 1 from a particular point-of-view;

PREFERRED EMBODIMENTS OF THE INVENTION

Figure 1:
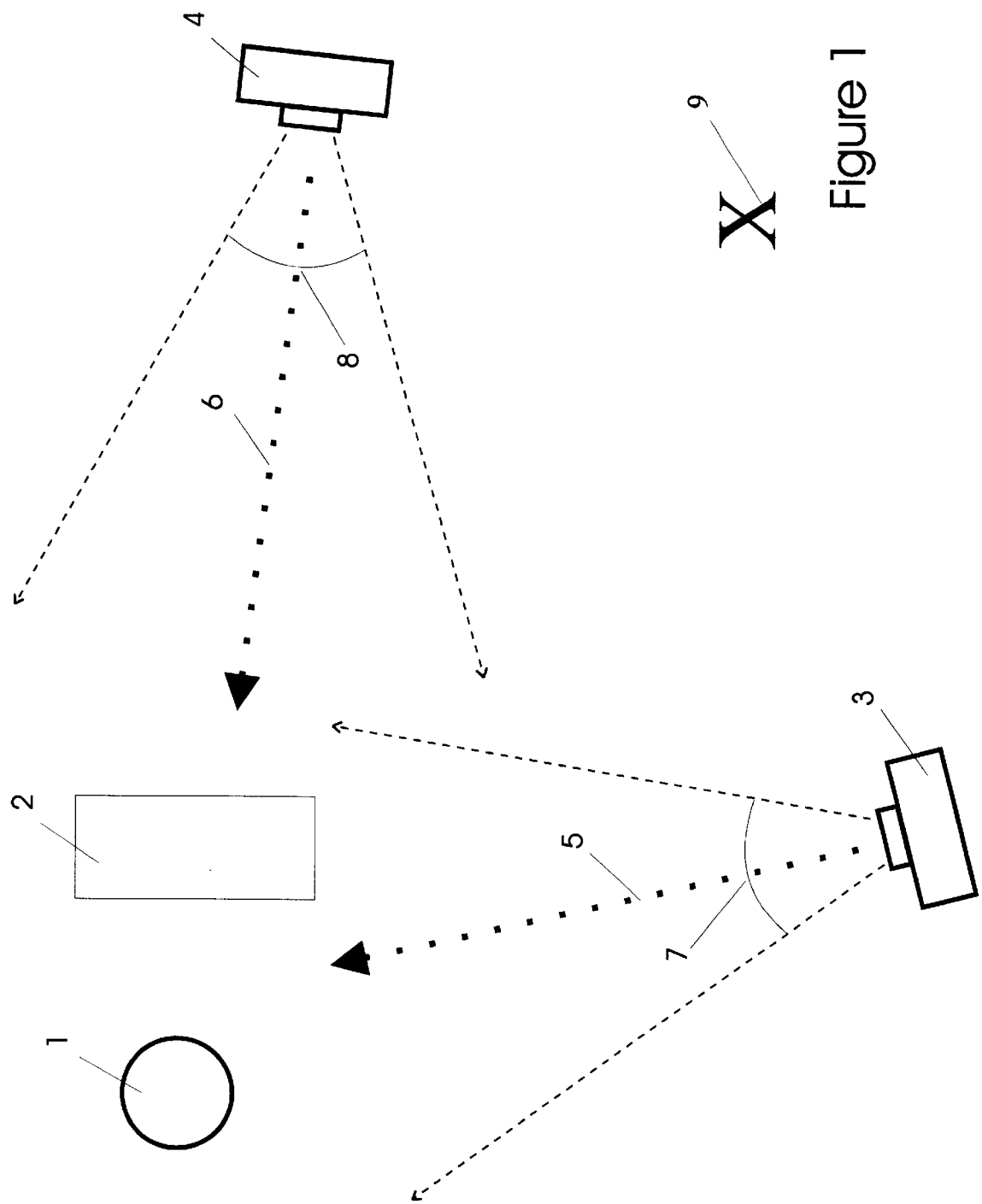
FIG. 1 is a schematic diagram of a simple scene and two vision systems.

Although one will appreciate the thorough extent to which the previous disclosures were made, a brief review of nomenclature may be usefully presented here. With reference to FIG. 1 a "scene" may contain certain objects for example a sphere 1 and a box 2. The directions indicated by 5 and 6 are the pointing directions of the respective vision systems 3 and 4 along with the fields-of-view 7 and 8 and define which parts of the scene are being addressed. Both vision systems 3 and 4 are addressing the objects 1 and 2. Vision system 3 has a different perspective of the objects 1 and 2 than vision system 4. A scene also includes the environment containing the vision systems and should be interpreted quite broadly for purposes of this invention. Although imaging system 4 appears to be addressing the scene containing the objects 1 and 2, the total scene also is comprised of areas outside the field-of-view of any particular vision system. We say that anything which may be addressed by a vision system is in a field-of-regard. Since the indicia "X" 9 can be addressed by the vision systems we say that it is part of the scene.

A vision system, either 3 or 4, may be comprised of: a camera, a position and attitude determining means, a computer, and a display. In addition, certain vision systems of the present invention are further comprised of a communication means such as a radio transmitter, receiver or transceiver which allow information exchange between other vision systems.

To illustrate best modes of employing the invention as anticipated by the inventors, three examples have been selected. The first example considers a simple scene having simple shapes as objects within the scene. As the scene is viewed from various points of view, including two points of view where vision systems may be located, objects of the scene tend to obstruct the view of other objects. By sharing information about the objects, the vision systems can reconstruct the blocked portion of the scene to reveal all of the objects including those previously blocked. Further details of this example follow.

A second example has been chosen which has a more complex scene, more complex interaction of objects within the scene, and more complex interaction of viewers of the scene. However, like the first example, certain viewers of the common scene may find some objects which are blocked by other objects. Viewers of the scene equipped with devices of the invention in communication with each other may share information between those devices. Accordingly, an image can be produced which reveals objects which were previously blocked from a viewer's direct line-of-sight.

Finally, a third example is presented which illustrates how other types of information sharing between users of visions systems may be employed to better comprehend features of a scene. In this example, images of real scenes are augmented with certain types of graphical objects to arrive at a composite image which appears to each user in the proper perspective with respect to the scene being viewed from that user's position. The reader will appreciate that some examples presented here rely on artistic drawings to maximize clarity. The drawings are illustrative of scenarios involving the vision systems but not necessarily illustrative of the images the systems produce. The final example shows some composite images as they may appear in devices of the invention. The other drawings are not intended to be actual images of scenes but to be illustrations thereof.

Figure 3:
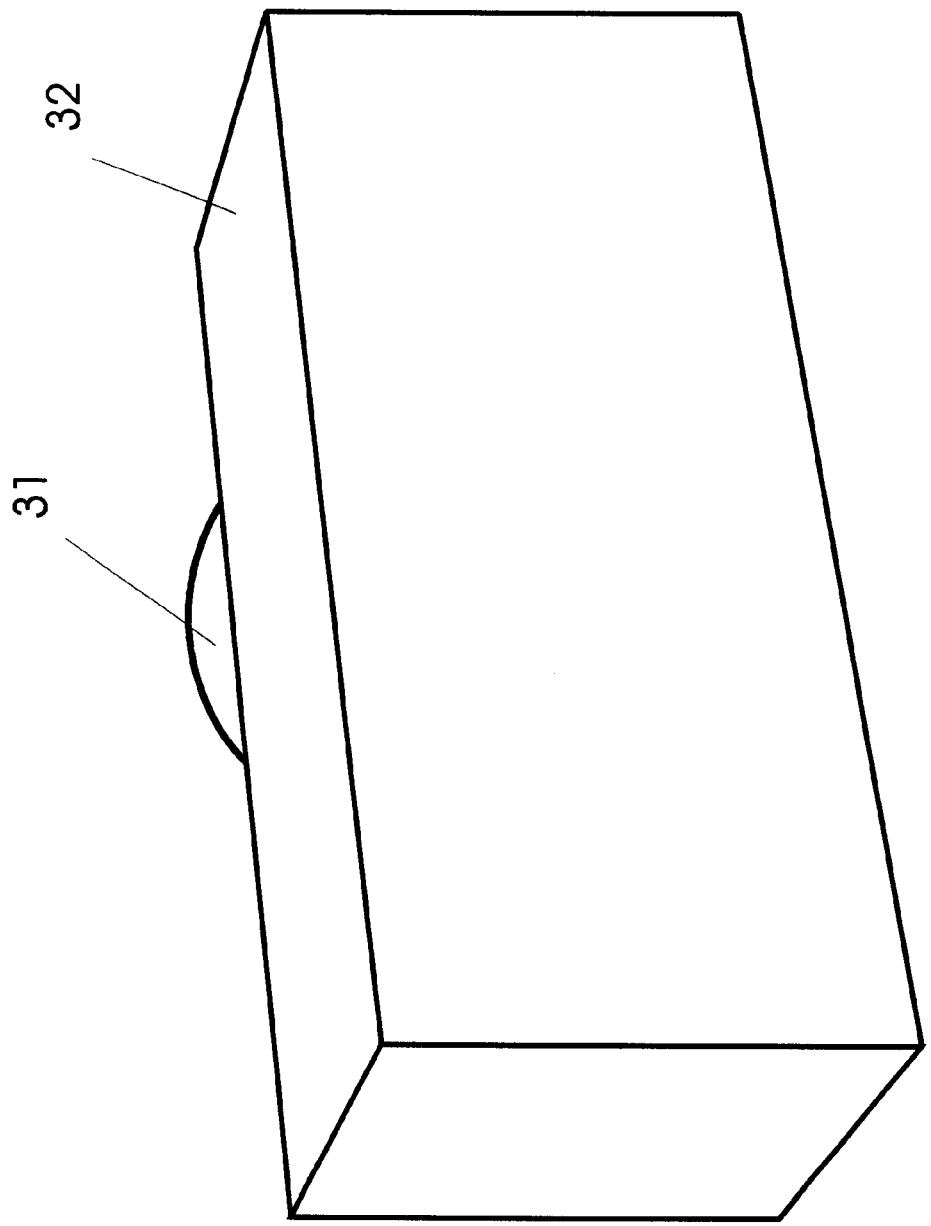
FIG. 3 is an image of the scene from a second point-of-view where an object in the scene is blocked by another object.

Now, with reference to the figures, the illustration of FIG. 1 is considered for a simple first example. A certain scene contains two objects: a spherical object 1 and a rectangular box 2 arranged as shown in relation to each other. A vision system 3 is arranged to address the scene from a particular point-of-view. The view for that vision system is defined by the viewing direction 5 and field-of-view 7. Another vision system 4 is also arranged to address the scene from a different point-of-view. That view is similarly defined by the viewing direction 6 and field-of-view 8. The perspective of the scene with be different for images generated by the first vision system when compared to the perspective of the scene in images generated by the second vision system. FIG. 2 shows a perspective view of an image of the scene as might be generated by vision system 3. The sphere 21 is to the left of and is near the box 22. Both objects are in clear view of the vision system 3. FIG. 3 shows a perspective view of the same scene as viewed by vision system 4. For this example, it is assumed that the box 32 is a solid and that one cannot see through the box. The sphere cannot be seen from the point-of-view of the vision system 4 except for a small portion representing the top of the sphere 31. As it may be desirable for a viewer at the location of vision system 4 to "see" the entire sphere, that viewer may wish to "ask" the vision system 3 for help interpreting the objects of the scene.

Figure 4:
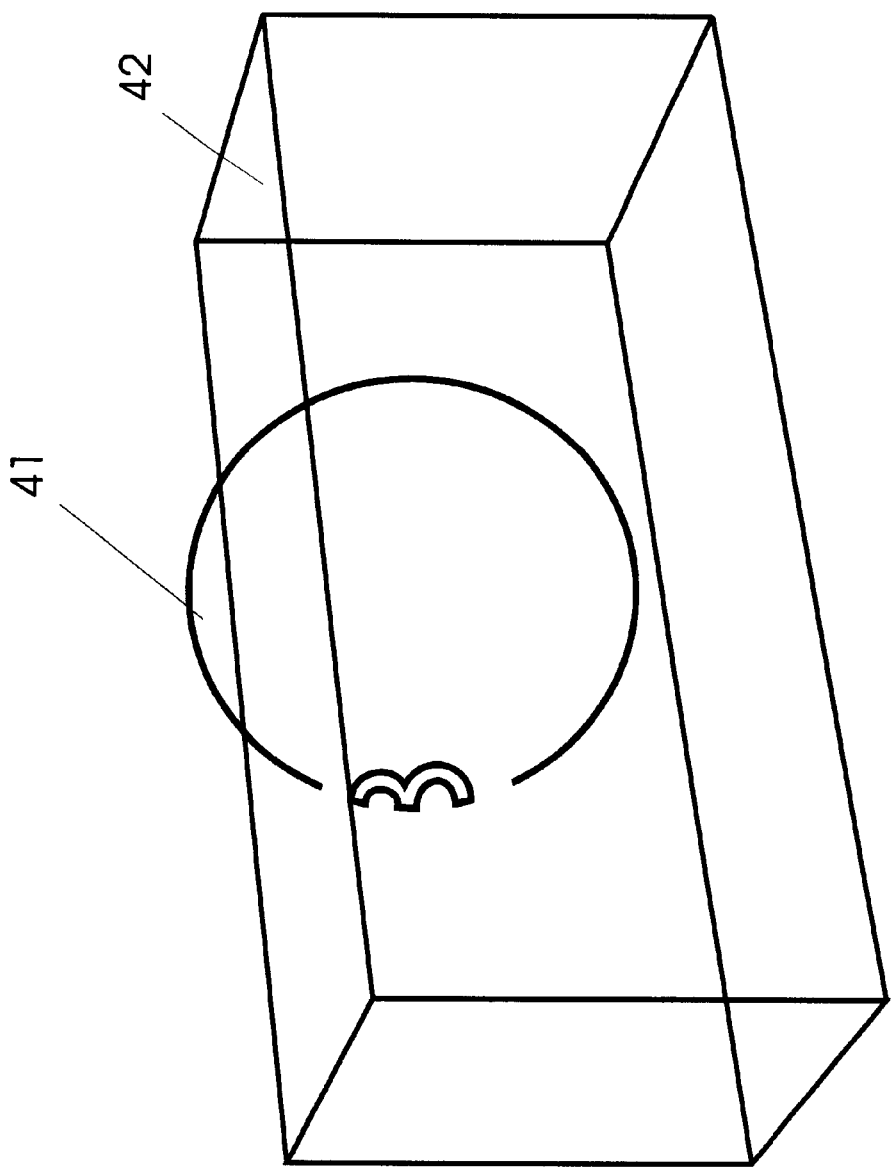
FIG. 4 is a composite image formed in consideration of both points-of-view.
Figure 5:
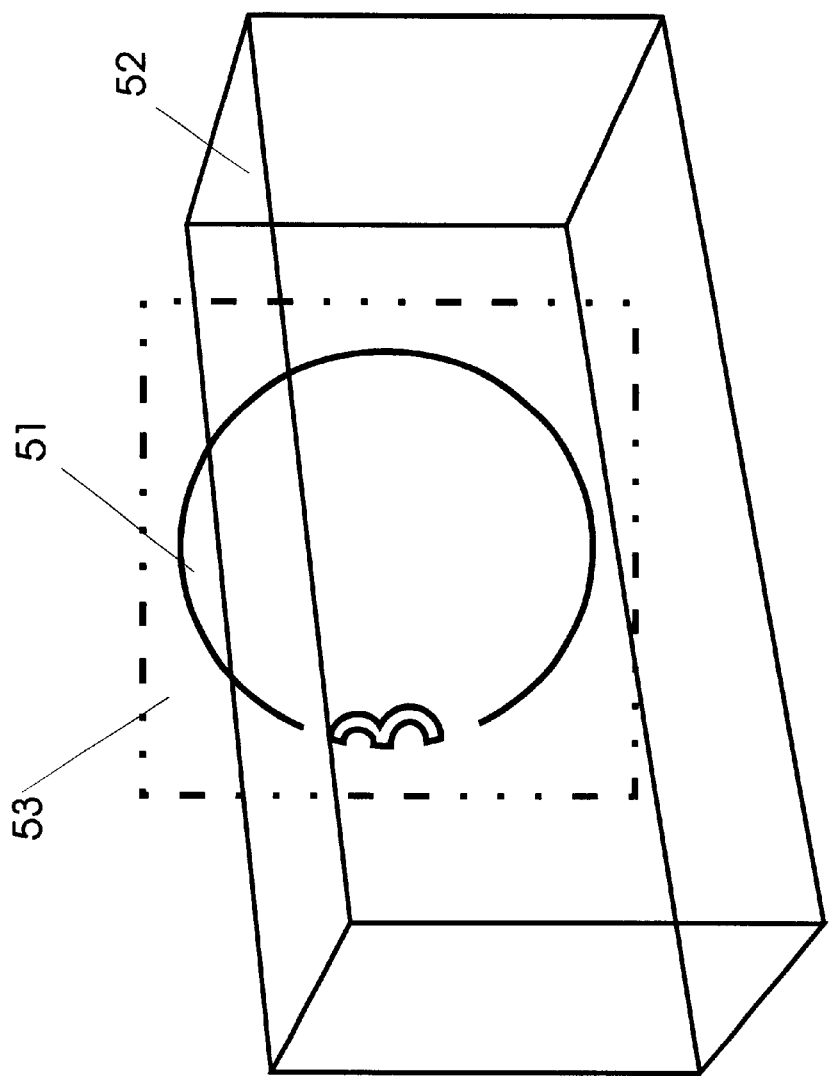
FIG. 5 shows the region of a augmented image which contains information from a second vision system.

Because it is possible to know with accuracy the relative positions of each of the objects of a scene and the positions and pointing attitudes of the vision systems addressing a scene, it is possible to use computer routines to operate on image data to perform a translations of perspective from a second perspective into that of a first perspective. If the vision system 3 transmits image information and information relating to its location and pointing attitude with respect to the scene, then the vision system 4 can manipulate the image information with a translation of perspective routine to determine what should appear in blocked areas. The vision system 4 can then present to its user an augmented image which has previously blocked regions "filed-in" with image information gathered by vision system 3. It is therefore possible for the second vision system 4 to present the image shown in FIG. 4 where the sphere 41 can be "seen" through the solid box 42. The image of FIG. 4 can be comprised of image information from two sources. In FIG. 5, a region 52 which contains image information from a first source, direct imaging from a camera of the vision system, is combined with a region 53 which contains image information including the blocked sphere 51 from a second source, information from the vision system 3. Region 53 is an image having a translated perspective. The image having its perspective translated is generated from imagery received from a camera (i.e. photonically) of the vision system 3 and processed in accordance with knowledge of the relative positions of each vision system. The two types of image information are combined electronically to form a single composite image to be presented to the user. The composite image is presented aligned to the real scene (reference the viewing direction) such that the user feels that orientation with the real scene. In this way a user can rely on data from other vision systems to "see through" objects of a scene.

Of course, this simple example is not very interesting and one generally can form a mental image to "fill-in" areas blocked by objects within such simple scenes. The following example, a second example, proposes a more complex scenario where the end result of combining information from two vision systems is quite spectacular.

When a fugitive is running from law enforcement officers, it may be of great advantage to the pursuers to employ helicopters having a preferred viewpoint. A helicopter is highly mobile and generally has a desirable point-of-view with respect to objects on the ground. However, a helicopter has difficulty engaging a target in a contact sense. It is therefore necessary to receive aid from ground support for final acquisition of a fleeing fugitive.

To link the pursuers, radio communication of verbal directions can be used to provide officers on the ground information relating to the fugitive's position. The efficiency of radio communication in this way may not be as good as is desired. Officers equipped with vision systems of the invention which share image information relating to different perspectives of a scene can more easily locate a fugitive.

Figure 6:
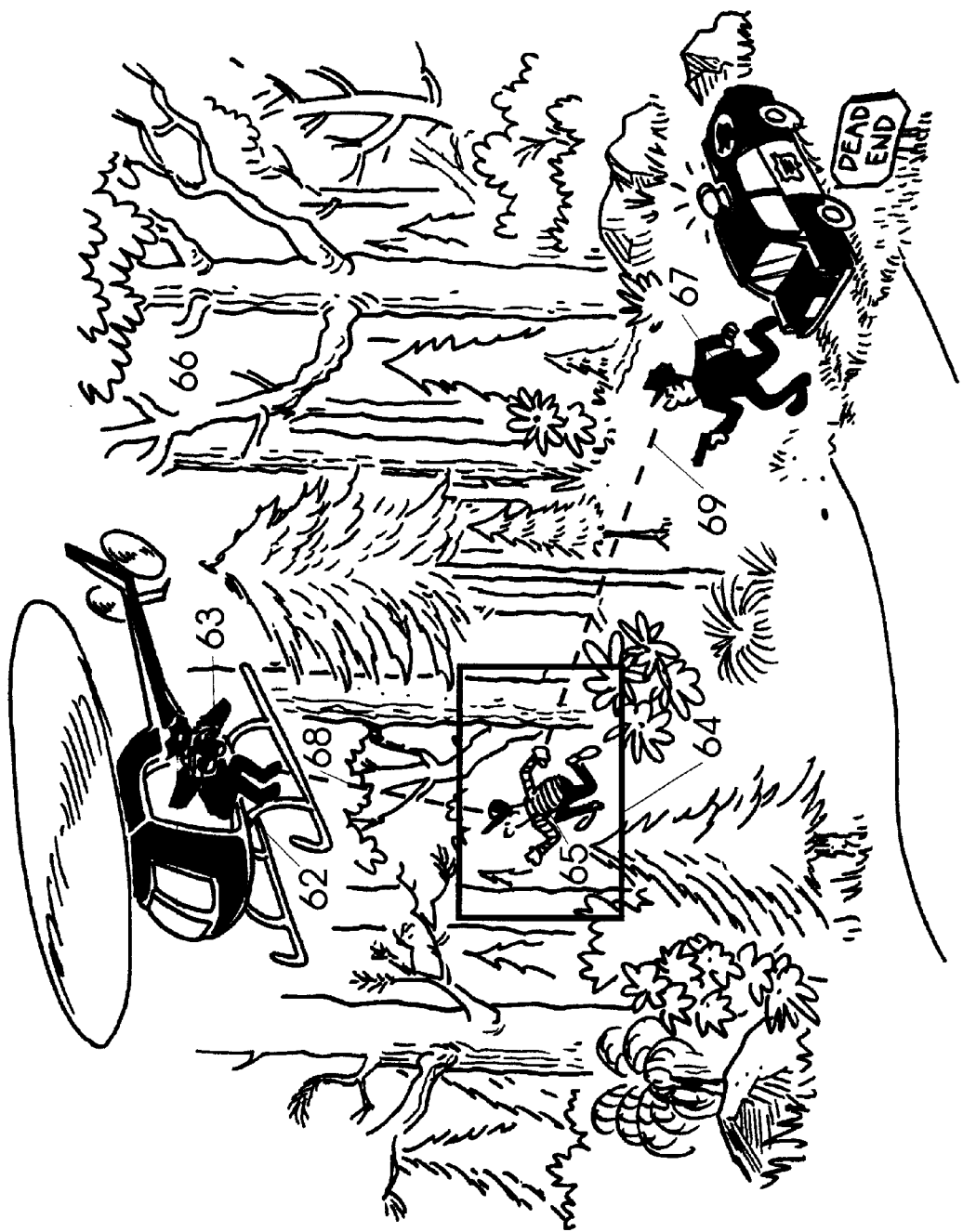
FIG. 6 shows a more complex example of a scene to be viewed by interested parties.

Consider FIG. 6 which illustrates pursuit of a fugitive 65 where a helicopter 62 containing a first officer 63 is looking down in a direction 68 onto a scene 64 containing a the fugitive 65 who has advanced into a dense forest 66. A second officer 67 in foot pursuit approaches the edge of the dense forest and is unable to see the fugitive as his view is blocked by the trees. He is even uncertain of the correct direction 69 in which the fugitive has fled. Although the officer in the helicopter can indicate by radio that North is the proper direction, the precise direction is unclear to the officer on the ground even if he is equipped with a compass which might indicate North.

Figure 7:
FIG. 7 shows a first party having view which is blocked by certain objects in the scene being addressed.

Alternatively, if the helicopter officer 62 points a vision system of the invention 63 in the direction 68 toward the scene 64 containing the fugitive 65, then the officer 67 at the edge of the forest can use information transmitted from vision system 63 to gain a new appreciation of the environment. FIG. 7 shows the officer 77 at the edge of the forest 76 with a vision system 71 that is in communication with the vision system 63 of the helicopter officer 62. By display of appropriate composite images, the officer 77 can very accurately identify the true direction 79 of the scene 74 containing the fugitive 75. Although a "live" image acquired with a simple electronic camera from the point-of-view of the officer 77 would likely only contain trees, that image can be augmented to also contain image data gathered by the vision system 63 of the helicopter officer 62. It may simply contain "hints" regarding direction or symbolic representation of objects within the scene but not necessarily accurate renderings of real objects.

Figure 8:
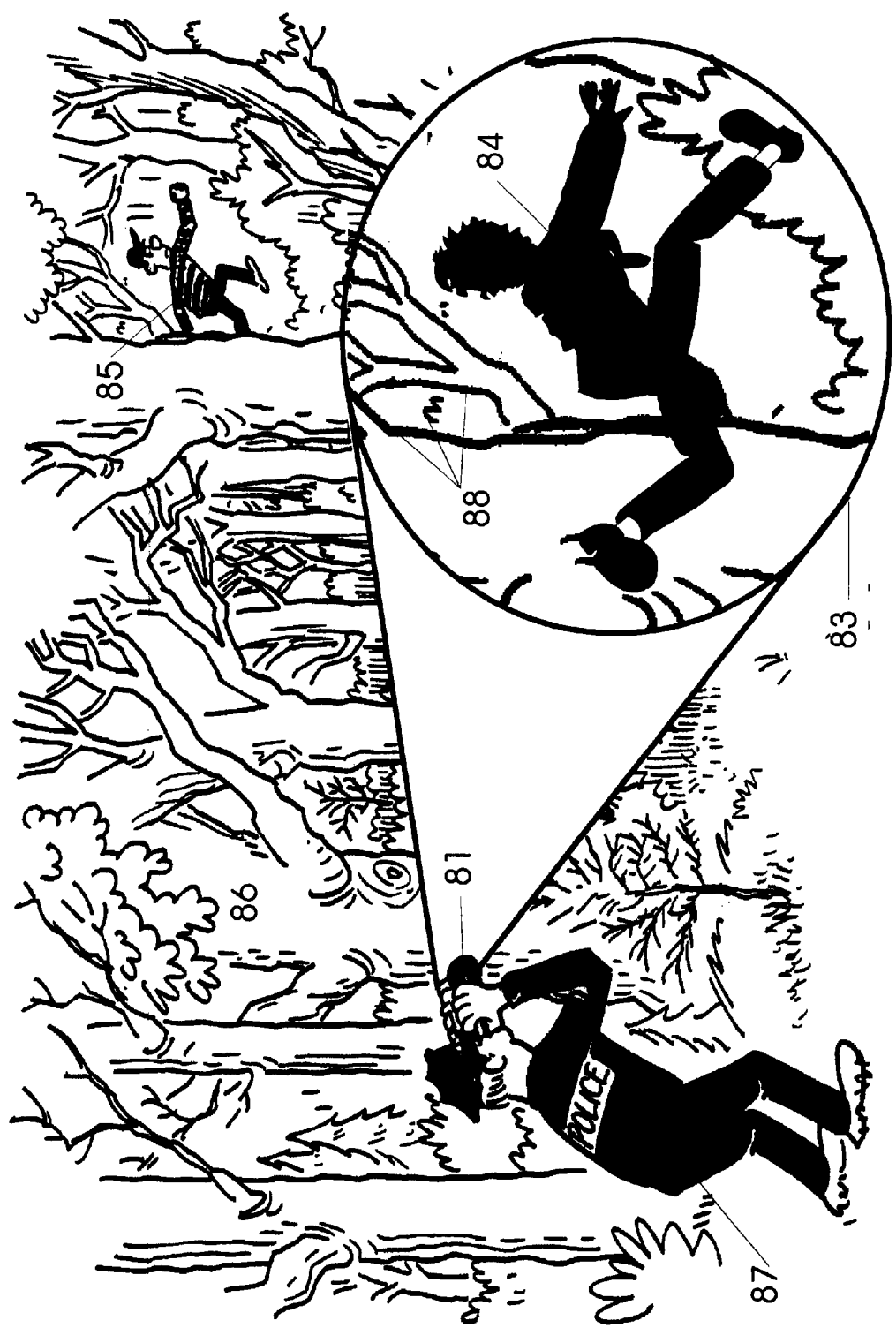
FIG. 8 shows the first party, the scene, and a view of the scene which includes information from a second party.

FIG. 8 shows a composite image which can be provided by some versions of systems of the invention. As the officer points his vision system toward the trees i.e. addresses the scene, the trees are imaged by an electronic camera of the vision system. In addition, the vision system can receive via radio transmission other data relating to the scene. Data which specifies which directions the officers are pointing their respective vision systems and data which specifies their relative locations. As it may be difficult to provide a translation of the real image of the fugitive 85, that image being complex in shape, a substitute icon may be presented instead. The proper placement of this icon within the composite images could accurately suggest the fugitive's location. The image system 81 of the officer 87 may present a composite image which looks like 83. Some features 88 of the real scene as collected by the camera may be superimposed with an icon 84 which corresponds to the fugitive to form a single composite image. The officer could then appreciate exactly where in the dense forest 86 the fugitive may be found. In this way the officer can "see through" the forest and positively locate the fugitive. This particular story suggests that the helicopter officer may have selected a "fleeing fugitive" icon and designated a position within the scene to place the icon. This feature of the system is achieved by well known point-and-click operations which are common in computer user interfaces. As long as the helicopter pilot can continue to designate the location of the true fugitive, the vision system of the officer on the ground can present the icon in the proper location and in the proper perspective.

Further details of interactions between complementary vision systems may be understood by considering another example. The previous examples were constructed to illustrate basic features and they use simple shapes and cartoons to illustrate various concepts. One should appreciate that those figures did not contain composite images comprised of images of real scenes. For clarity, the following example includes composite images having images of real scenes as they might be formed with an electronic camera. Each of the images in FIGS. 9–12 are composite images as would be present in vision systems of the invention.

Figure 9:
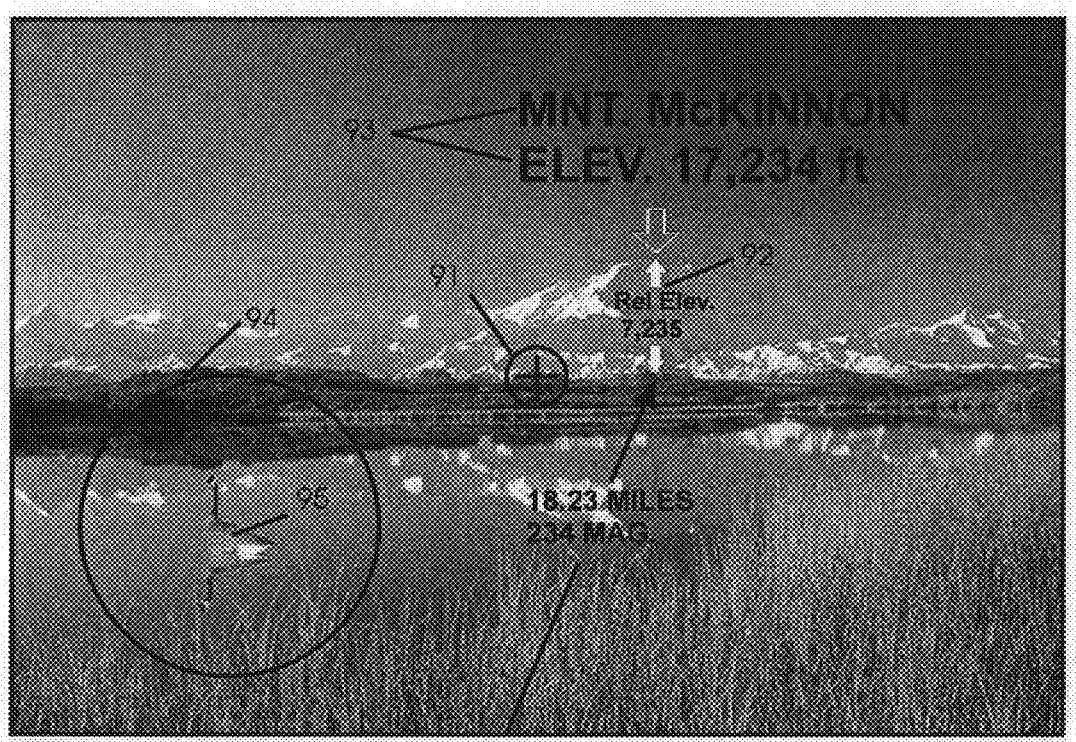
FIG. 9 is an image of a scene of real mountains as it might be augmented with certain graphical indicia.

The image of FIG. 9 is a scene of Mount McKinnon 92 and the immediate environment as presented by a vision system of the invention. A boresight crosshairs icon 91 can be added to the optically acquired image of the real scene to help the user identify the pointing direction of the device. Sometimes the crosshairs icon is useful for point and click operations to designate certain locations or objects. Computer generated indicia 93 identifying the mountain and features thereof can be also be added to the image of the real scene. It is not new to add such indicia to live images of scenes being addressed by electronic cameras. However, the particular indicia 92 relates to the user's position. A relative elevation measurement depends on the elevation (position) of the user. The elevation of the mountain with respect to sea level may always be 17,234 feet, but the relative elevation or the elevation with respect to the location of the reference may change as the reference changes location. If the user is at an elevation of 9,999 then the relative elevation is 7,235 as indicated by the label in the composite image. In addition, distance from the mountain and direction to the mountain may be displayed with certain other appropriate indicia.

As there may be certain objects or areas within a scene which may have special interest, we provide a mechanism for "selecting" an area of the image. In the lower left corner of the image of FIG. 9 is a goose. A user of the system may wish to address this object specifically. Although many selection techniques may prove useful, we suggest for example one familiar in computer graphics applications. The boresight crosshairs may be used as a pointer and click-and-drag techniques might specify size of objects or areas to be designated. By pointing the crosshairs icon at the goose, clicking a button, and dragging the pointer, one can select the area indicated in the image by the circle 94. In this way, we "select" the goose, a particular object within the optically acquired image. It is further possible to add desired labels to such objects.

Figure 10:
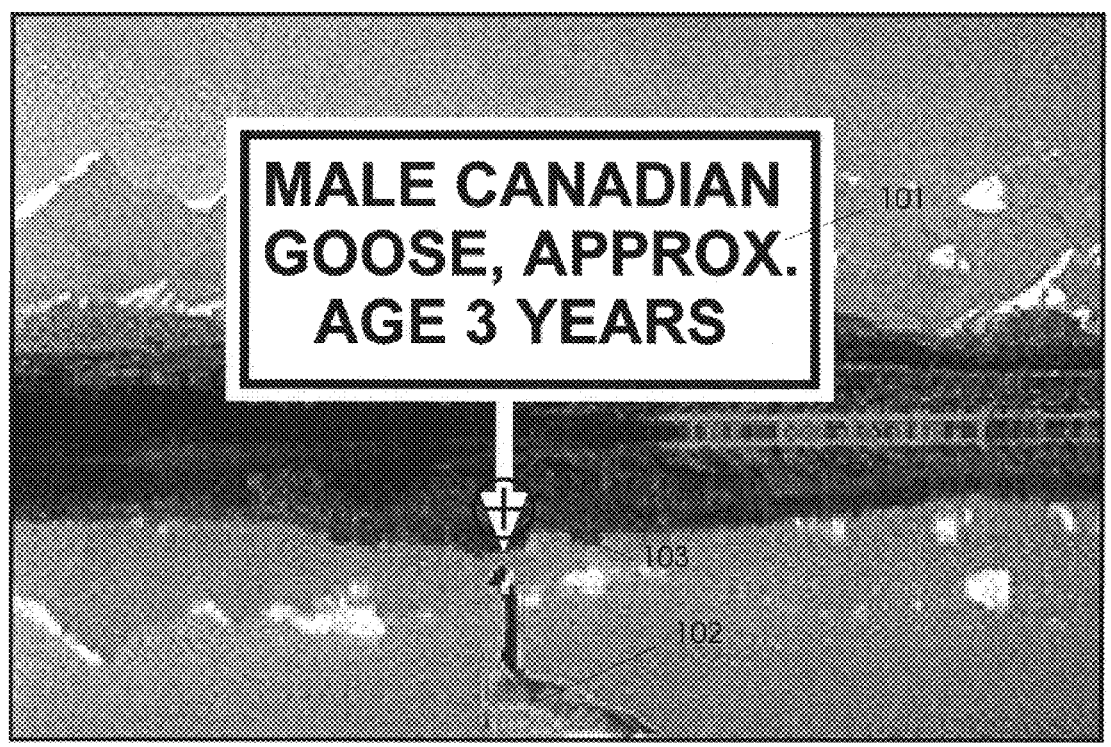
FIG. 10 illustrates graphical objects which the user may place in the image of the real scene.

FIG. 10 shows a magnified image of the area of special interest. By keystroke entry or other user input, one can create a label 101 for the goose 102. The label may be movable with the crosshairs as directed by the user's actions. Alternatively, the label can be placed and fixed to an object. Again, with common point-and-click techniques, graphical objects of the composite image can be manipulated. If we choose a "fix" command for the label, the position within the real scene can be "marked" or remembered by the computer. The pointing direction of the vision system could then move independently of the label; the label would remain in the image at the fixed location (direction). The label which we have created and associated to the goose by "fixing" it to the position in the real scene near the goose is a label which may be created by a user of a first vision system, for example a tour guide or forest ranger. A second user of a second vision system in a remote location may wish to learn of the information provided by the first user. Since the example information is particular to the position of an object in the real scene and each vision system has a different perspective of the same scene, a translation is required to properly locate the label as it should appear to the second user. As vision systems are quite dynamic in position and attitude and independent of one another, there is no assurance that the second user is even addressing (pointing the camera towards) at the same scene.

Figure 11:
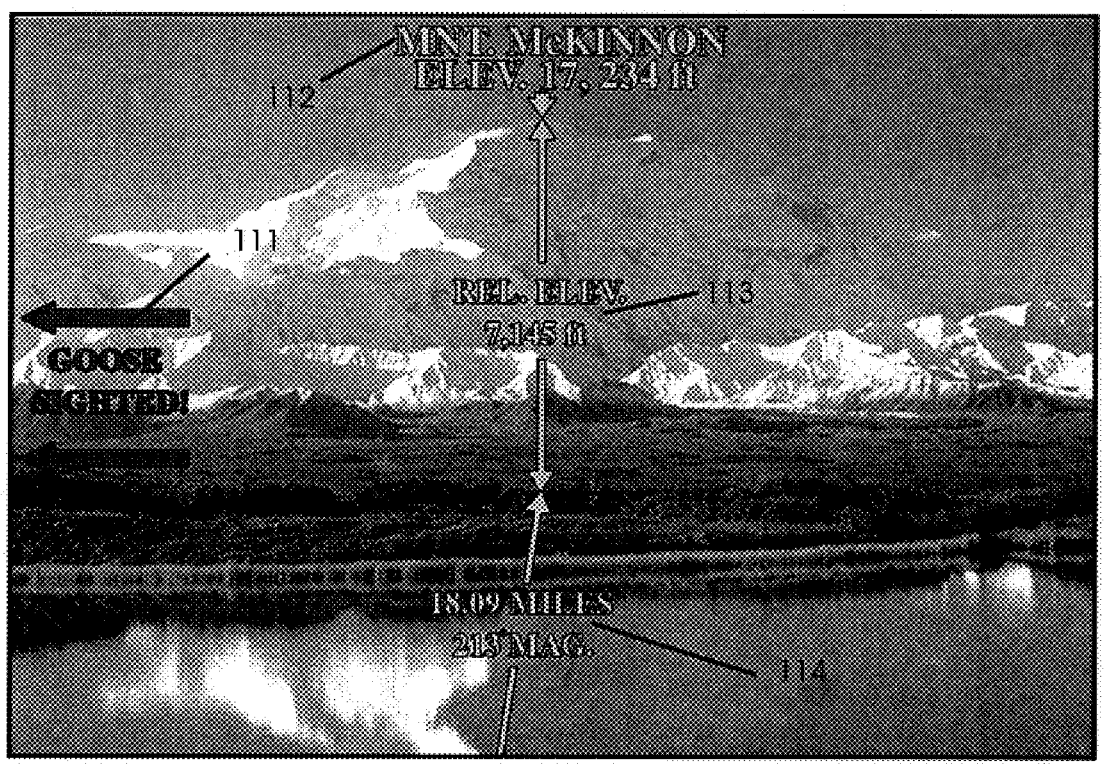
FIG. 11 shows an image of the same scene as it is viewed from a different point of view including information from a second vision system.
Figure 12:
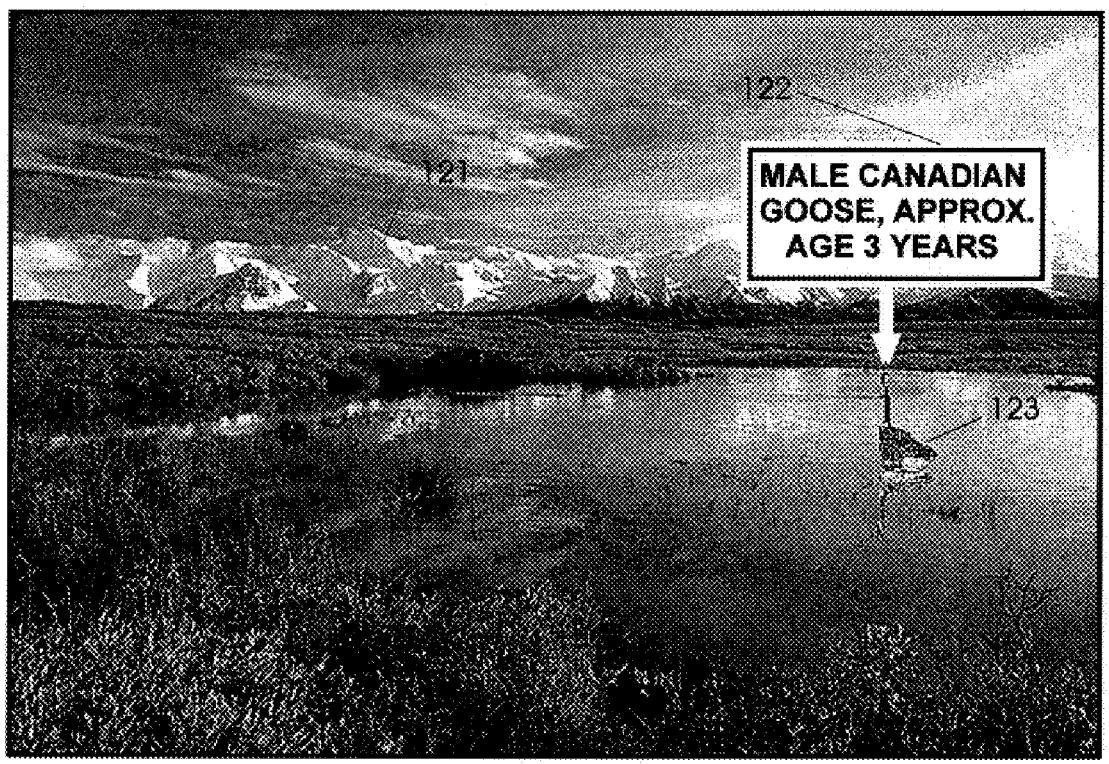
FIG. 12 shows an image of a scene having objects from a second vision system.

If a nature tour guide had a group of explorers distributed about the region and provided the label to the scene as shown in FIG. 10 it may then be desirable to transmit the image information to the others. Of course each person being randomly distributed might have their own perspective of the same scene. When the "image" is transmitted to others it is meant that objects, images and related information is transmitted in addition to perspective translation information (vision system position and attitude information). Any receiving vision system could then present the transmitted image in the perspective unique to the location of that receiving vision system. As it is entirely possible that image features of one vision system would be outside the field-of-view of a second vision system, mechanisms are created to provide for these cases. FIG. 11 shows an image generated by the vision system of a second user compare to the image of FIGS. 9 and 10. The perspective of the second vision system which is closer to the mountain is clearly different than that of the first. The labels 112, 113 and 114 of FIG. 11 are appropriate for the location of the second system. The goose which was designated by the user of the first vision system is not within the field-of-view of the second system as illustrated by FIG. 11. Therefore a new label 111 has been generated to indicate that a goose has been sighted by another user and to indicate in which direction it can be found. The user of the second system can then pan left to acquire an image of the goose. FIG. 12 shows how the goose 123 may look to the second vision system with the label 122 provided by the first vision system and a very different background 121.

Although the present invention has been described in considerable detail with clear and concise language and with reference to certain preferred versions thereof including the best mode anticipated by the inventor, other versions are possible. Therefore, the spirit and scope of the appended claims should not be limited by the description of the preferred versions contained therein.

We claim:

1. An apparatus for displaying composite images of a scene comprising a plurality of vision systems operable for addressing a common scene, each vision system being dynamic in position and attitude and independent of the position and attitude of each other system, the apparatus comprising at least two vision systems in communication with each other.

2. An apparatus of claim 1 at least one vision system comprising:

a position determining means;

an attitude determining means;

a computer;

a camera; and a display, said position determining means arranged to determine the position of the vision system camera;

said attitude determining means arranged to determine the pointing attitude of the camera;

said computer being coupled to each of the position determining means, attitude determining means, the camera, and the display.

3. An apparatus of claim 1 each vision system comprising:

a position determining means;

an attitude determining means;

a computer;

a camera; and a display, said position determining means arranged to determine the position of the vision system camera;

said attitude determining means arranged to determine the pointing attitude of the camera;

said computer being coupled to each of the position determining means, attitude determining means, the camera, and the display.

4. An apparatus of claim 2 at least two vision systems being electromagnetically coupled.

5. An apparatus of claim 3 at least two vision systems being electromagnetically coupled.

6. Methods of forming composite images with a plurality of vision systems each having a different perspective of a common scene, the method comprising the steps:

determine the position and attitude of each vision system;

form an image of the scene being addressed with each vision system;

transmit image information from a first vision system to a second vision system;

translate the perspective of the transmitted image to form an image having the perspective of the second vision system;

combine the image having a translated perspective with an image formed by the second vision system to form a composite image; and present the composite image in the natural perspective of the second vision system.

7. Methods of claim 6 said 'form an image of the scene being addressed with each vision system' step further comprising:

generate an image photonically recall image data from a data store in accordance with position and attitude measurements; and form graphical objects to be combined with images.

8. Methods of claim 6 said 'transmit image information from a first vision system to a second vision system' step further comprising:

transmit an image formed by the first vision system transmit the first vision system position and attitude information; and transmit graphical objects formed at first vision system.

9. Methods of claim 6 said 'translate the perspective of the transmitted image to form an image having the perspective of the second vision system' step further comprising:

translate perspective of the image information in accordance with the position and attitude of the first vision system; and reform graphical objects in new perspective to appear normal to display field.

* * * * *